(12) United States Patent
Bock

(10) Patent No.: US 7,677,495 B2
(45) Date of Patent: Mar. 16, 2010

(54) BAGGAGE COMPARTMENT, IN PARTICULAR AN ENCLOSED COMPARTMENT FOR AN AIRCRAFT CABIN

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 227 days.

(21) Appl. No.: 11/694,278

(22) Filed: Mar. 30, 2007

(65) Prior Publication Data

US 2007/0236228 A1 Oct. 11, 2007

Related U.S. Application Data

(60) Provisional application No. 60/796,883, filed on May 3, 2006.

(30) Foreign Application Priority Data

Mar. 30, 2006 (FR) .................................. 06 02737

(51) Int. Cl.
*B64D 11/00* (2006.01)

(52) U.S. Cl. ................................................. 244/118.5

(58) Field of Classification Search .............. 244/129.3, 244/118.5, 129.4
See application file for complete search history.

(56) References Cited

U.S. PATENT DOCUMENTS

| | | | | |
|---|---|---|---|---|
| 5,042,923 | A * | 8/1991 | Wolf et al. | 359/275 |
| 5,269,111 | A * | 12/1993 | McDougall | 52/455 |
| 5,441,218 | A * | 8/1995 | Mueller et al. | 244/118.1 |
| 5,790,209 | A | 8/1998 | Engelhardt et al. | |
| 6,168,283 | B1 * | 1/2001 | Howell | 362/84 |
| 6,493,128 | B1 * | 12/2002 | Agrawal et al. | 359/265 |
| 6,802,478 | B2 * | 10/2004 | Katori | 244/118.1 |
| 6,824,291 | B2 * | 11/2004 | Vautrin et al. | 362/156 |
| 6,886,781 | B2 * | 5/2005 | Lau et al. | 244/118.1 |
| 2008/0078871 | A1 * | 4/2008 | Munson et al. | 244/118.5 |

FOREIGN PATENT DOCUMENTS

| | | |
|---|---|---|
| EP | 0 709 712 A2 | 5/1996 |
| EP | 1 114 773 A2 | 7/2001 |
| EP | 1 371 555 A2 | 12/2003 |

* cited by examiner

*Primary Examiner*—Tien Dinh
(74) *Attorney, Agent, or Firm*—Oblon, Spivak, McClelland, Maier & Neustadt, L.L.P.

(57) ABSTRACT

An enclosed baggage compartment is arranged in a space configured to accommodate travelers in a vehicle. The compartment includes at least one wall defining the compartment and is visible from the travelers' space within which the compartment is located. The wall includes at least one opening closed off with a transparent material.

20 Claims, 1 Drawing Sheet

BAGGAGE COMPARTMENT, IN PARTICULAR AN ENCLOSED COMPARTMENT FOR AN AIRCRAFT CABIN

BACKGROUND OF THE INVENTION

I. Field of the Invention

This invention relates to a baggage compartment, in particular an enclosed compartment for an aircraft cabin.

II. Description of Related Art

The sphere of this invention is the transport of passengers, for example in an aircraft. During a trip, travelers' baggage, generally large-sized baggage, is placed in a hold or similar area, while smaller and relatively light baggage can accompany the travelers in the space—often called a cabin or compartment, depending on the mode of transport—in which they are traveling. In this space, storage compartments are provided for this smaller baggage, also called hand baggage.

In an aircraft, more often than not the compartments for hand baggage are arranged in the upper portion of the aircraft cabin, beneath the ceiling of this cabin and above the seats intended to accommodate the passengers.

In aircraft, there are two major types of baggage compartments such as described previously. On the one hand there are baggage bins and on the other hand baggage racks. A baggage bin is a compartment fixed in relation to the aircraft cabin, and a door, generally pivoting, allows the opening and closing of access to the baggage compartment. A baggage rack, for its part, also has a compartment intended to accommodate baggage and comprising an access. Here this compartment is a compartment movable between a first extended position in which access to the compartment is open, allowing the insertion and removal of baggage, and a position retracted inside the ceiling of the aircraft cabin, in which access to the compartment is closed.

BRIEF SUMMARY OF THE INVENTION

This invention relates to these two types of baggage compartments and more generally any enclosed baggage compartment. The problem behind this invention is to be able to determine whether an enclosed baggage compartment is occupied without having to open it and/or to be able to find a piece of baggage in a space for travelers more rapidly, without having to open several baggage compartments. This concern is in line with increasing passenger comfort, in particular when the baggage compartments are arranged overhead and opening thereof is made difficult by reason of their position.

To this end, it proposes an enclosed baggage compartment arranged in a space intended to accommodate travelers in a vehicle, this compartment comprising at least one wall defining it and visible from the travelers' space within which it is located.

According to the invention, the said wall comprises at least one opening closed off with a transparent material associated with concealing means making it possible to see through the said opening or else to conceal this opening, as one wishes.

In this way it is possible to see inside such a compartment without having to open it. In addition, the compartment remains enclosed since the openings are closed off. No object then can fall out of the compartment when the vehicle is in motion. In an aircraft, this is particularly advantageous, because it then becomes unnecessary to open all the baggage compartments prior to boarding of the passengers. It is possible to check that the compartments are empty without opening them.

A compartment according to the invention also makes it possible for a passenger to see his baggage during the trip. In this way he can retrieve it more easily in the course or at the end of the trip.

It also is possible to see through the opening implemented in the wall of the compartment or to conceal this opening, as desired. In the latter case, the concealing means preferably are such that the baggage compartment has a uniform appearance in the cabin. It can involve a curtain or a movable flap of the same color as the exterior of the baggage compartment so as to blend into the surroundings.

According to a preferred embodiment, these concealing means comprise a liquid crystal layer associated with means for subjecting this liquid crystal layer to a difference of electric potential, this layer being opaque or translucent depending on the difference of potential applied.

The said wall can comprise several openings in the form of slits spaced over the length of the said wall, each of the slits being closed off with a transparent material. These multiple slits then make it possible to see clearly what is in the baggage compartment over the entire length thereof.

In order better to see the inside of the compartment through the openings provided, the inner face of the wall advantageously comprises means for illumination of the inside of the compartment. These means comprise, for example, an electroluminescent sheet.

The inner face of the wall provided with at least one opening preferably has at least one concave zone, and the openings are arranged in this concave zone. By virtue of the concave shape, the baggage, for the most part, does not reach the back of the concave zone and thus forms a "bridge" over this concave zone. By positioning the openings at this point, a space is left free between the inner face of the wall and the baggage. This makes it possible to see the inside of the compartment better through the openings. The means of illumination, to the extent that they are provided, preferably shine into this zone.

This invention also relates to an aircraft cabin and/or an aircraft, characterized in that they comprise at least one baggage compartment such as described above.

Details and advantages of this invention will emerge more clearly from the description that follows, presented with reference to the attached schematic drawings on which:

DETAILED DESCRIPTION OF THE INVENTION

Figure 1:
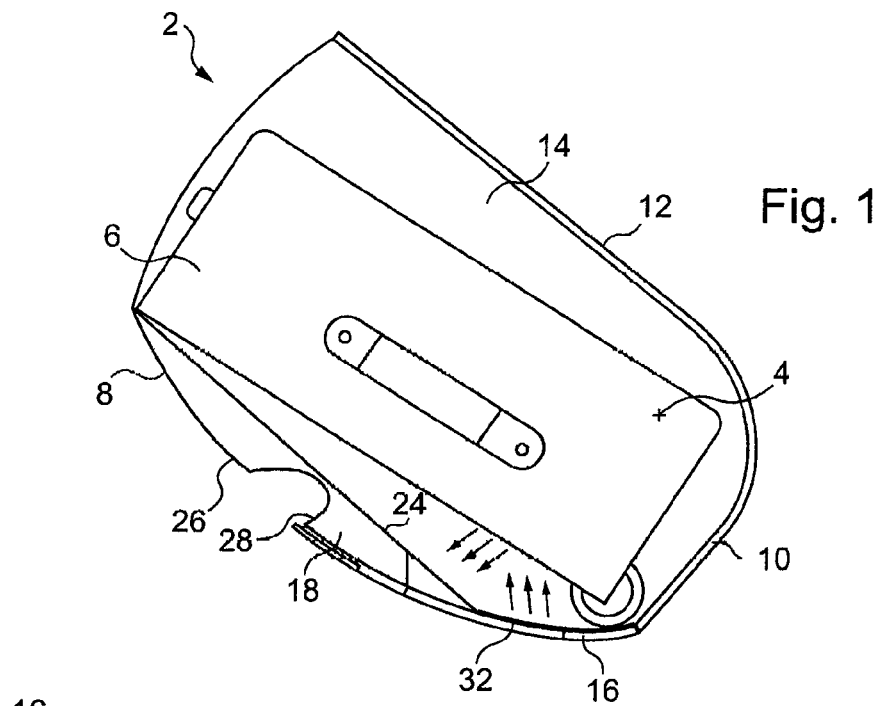
FIG. 1 is a schematic view in cross section of a baggage compartment according to the invention in closed position.
Figure 3:
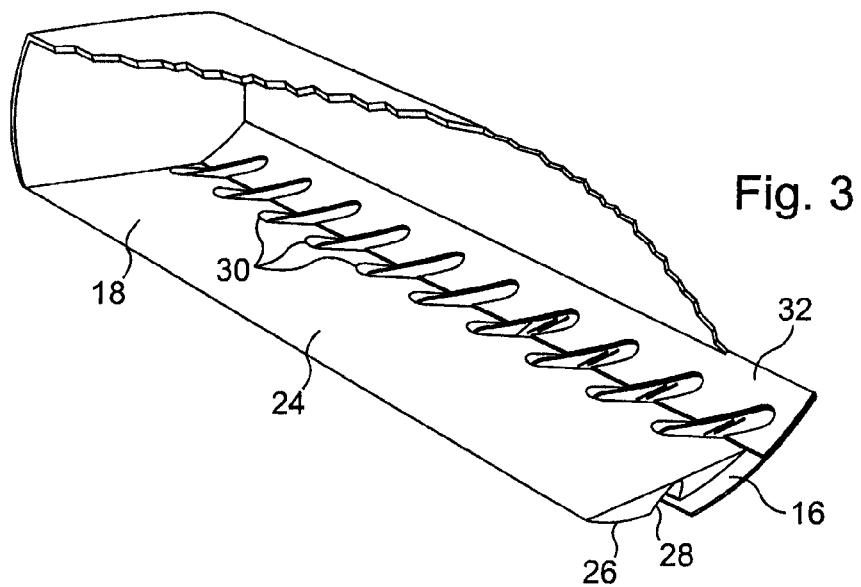
FIG. 3 shows a portion of the compartment of FIG. 1 in perspective and on a reduced scale.

A baggage rack 2 of the type mounted in an aircraft cabin is seen on FIGS. 1 and 3. It involves a rack mounted pivoting around an axis of pivoting 4, and located, for example, in the upper portion of this cabin, above the passenger seats not depicted. A suitcase 6 is depicted inside this compartment on FIG. 1. The axis of pivoting 4 is a longitudinal axis in relation to the aircraft cabin.

The baggage rack 2 comprises a lower wall 8, a back 10, an upper wall 12 and side walls 14. The overall shape of this rack is more or less parallelepipedal with a rounded lower face. The face opposite the back 10 is a completely open face.

When the baggage rack 2 is in closed position, only the lower wall 8 thereof is visible from the cabin in which it is located. In open position, this lower wall 8 is partially concealed and the face opposite the back 10, for its part, also is visible—and accessible—in order to make it possible to move baggage into or out of the baggage compartment.

The lower wall 8 of the baggage rack 2 comprises two components: a rear panel 16 and a front portion 18.

Figure 2:
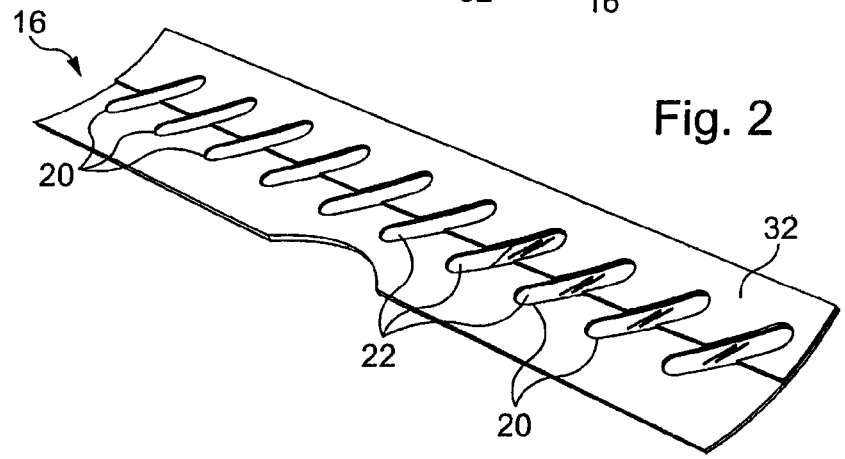
FIG. 2 shows a component of the compartment of FIG. 1.

The rear panel 16 has an elongated shape slightly curved along a longitudinal axis. It is connected to the back 10 of the baggage rack 2. It is noted on FIGS. 2 and 3 that this rear panel 16 is provided with a series of slits 20 distributed over the entire length of the panel. Each of these slits 20 forms an opening in the rear panel 16 that is closed off with a pane 22 made of a transparent material, preferably of a synthetic material in order to avoid any problem of broken glass.

When the baggage rack 2 is closed, the slits 20 form permanent windows that make it possible to see inside the rack.

In a preferred embodiment, a liquid crystal layer covers each pane 22 associated with a slit 20. Means for subjecting this liquid crystal layer to a difference of electric potential then also are provided and this layer is opaque or translucent, depending on the difference of potential applied. For esthetic reasons, the color of this liquid crystal layer, when it is opaque, preferably corresponds to the color of the outer face of the rear panel 16. From the inside of the aircraft cabin, the rear panel 16 therefore has a uniform appearance when the panes 22 of the slits 20 are made opaque.

The front portion 18 of the lower wall 8 is a profiled part that comes to overlap the rear panel 16. The inner face 24 of the front portion 18 is more or less flat. As for the outer face 26 of the front portion 18, it is of overall cylindrical shape and takes on the curvature of the rear panel 16, thus permitting a reliable assembly of the two components in order to form the lower wall 8. The outer face 26 of the front portion has a groove 28 that can be used as a handle for opening and closing the baggage rack 2.

In the embodiment depicted in the drawings, the front portion 18 overlaps the zone of the rear panel 16 in which the slits 20 are implemented. Notches 30 then are provided in the corresponding edge of the front portion 18 so that the front portion 18 does not cover the slits 20 of the rear panel 16.

The slits 20 make it possible to see inside the baggage rack 2, even when the latter is closed, to the extent that the panes 22 are not concealed by the liquid crystals. In order to make it possible to see better into the baggage rack 2 in closed position, an advantageous variant of embodiment provides that means of illumination are arranged inside the rack.

In a preferred embodiment, these means of illumination comprise an electroluminescent sheet 32. It involves a sheet of small thickness (on the order of a millimeter) that lights up under the effect of an electric impulse. This means of illumination has the advantage on the one hand of occupying little space, and on the other hand of causing little—or no—heating. This sheet covers, for example, the portion of the rear panel 16 that is not covered by the front portion 18. This electroluminescent sheet 32 of course does not cover the slits 20. This sheet therefore is on the side of the bottom 10 of the baggage rack 2. Such an electroluminescent sheet 32, or another means of illumination, also could be positioned, for example, on the inner face 24 of the front portion 18 of the lower wall 8 or on the inner face of the back 10.

As clearly emerges from the foregoing, it is possible to see into a baggage rack 2 without having to open it. Therefore, at the time of boarding of passengers in an aircraft, it is not necessary to open all the baggage compartments in order to check that they are empty. Likewise, at the time of deplaning of passengers, or else in the course of a flight, if a passenger is looking for his hand baggage, it is easy for him to see in what compartment his baggage is located. It then is unnecessary to open a compartment in order to realize that his baggage is not there.

The functioning of the liquid crystals described above and which make it possible to make the panes opaque can be left to the preference of the airline companies. It can be provided, for example, that the panes are made opaque when the rack is in open position. At night, when the interior illumination of the cabin is turned off, it also can be provided to make the panes of the baggage-rack slits opaque. Indeed, most of the travelers are sleeping and therefore do not need to access their baggage.

The means of illumination inside the baggage rack can be turned on as soon as the rack is closed and the panes of the openings implemented in the baggage compartment are not concealed. When the compartment is open, it can be assumed, in fact, that sufficient ambient light from the cabin illumination illuminates the inside of the baggage compartment and the baggage placed therein, and it is unnecessary to illuminate the inside of the baggage compartment when it is closed and the panes are made opaque by the liquid crystals (or other means).

By virtue of the special shape of the lower wall 8, inside the baggage rack 2, the electroluminescent sheet 32 described above effectively illuminates the inside of the rack even when baggage is placed therein. In fact it is noted on FIG. 1 that the inner face of the lower wall 8 toward the back 10 is of concave shape. Thus when an object with a more or less flat face, such as the suitcase 6 depicted, is positioned in the rack, it does not come to cover the electroluminescent sheet 32. This sheet, therefore, can effectively illuminate the lower face of the suitcase 6. The latter then is fully visible from the cabin through the slits 20.

It thus is advantageous initially to provide a concave zone in the inner face of the lower wall (that is to say, the wall of the baggage compartment visible from the cabin). The openings implemented in the lower wall then preferably are in this concave zone. Thus, the baggage, or at least most of it, does not come to rest directly on the openings, leaving a space between the baggage and the opening. In that way, the field of vision from the outside of the baggage compartment toward the inside of this compartment is broader. Finally, it is advantageous to illuminate this free space between the inner face of the baggage compartment and the baggage. The means of illumination, to the extent that any exist, are, for their part, also close to this concave zone.

This invention is not restricted to the preferred embodiment described above by way of non-limitative example. It also relates to all the variations within the reach of the individual skilled in the trade, in the context of the claims below.

The invention claimed is:

1. A baggage compartment enclosed in a space configured to accommodate travelers in a vehicle, the compartment comprising at least one wall defining the compartment, wherein
   the compartment is visible from a space of the travelers within which the compartment is located,
   the wall includes several openings in a form of slits spaced over a length of the wall, and each of the slits are closed off with a transparent material configured to allow a view through the opening,
   a front portion of the wall overlaps a panel of the wall in which the slits are located,
   the transparent material is covered with a liquid crystal layer and a means for applying a difference of electric potential to the liquid crystal layer, and the layer is opaque or translucent depending on the difference of potential applied.

2. The baggage compartment according to claim 1, wherein an inner face of the wall comprises an illumination means for illuminating an inside of the compartment.

3. The baggage compartment according to claim 2, wherein the wall is configured such that the illuminating means illuminates the compartment even when baggage is placed in the compartment.

4. The baggage compartment according to claim 2, wherein the illuminating means is turned on as soon as the compartment is closed.

5. The baggage compartment according to claim 2, wherein the illumination means comprise an electroluminescent sheet.

6. The baggage compartment according to claim 5, wherein a thickness of the sheet is substantially one millimeter.

7. The baggage compartment according to claim 5, wherein the sheet covers a rear portion of the wall that is not covered by a front portion of the wall.

8. The baggage compartment according to claim 1, wherein an inner face of the wall comprises at least one concave zone, and the openings are arranged in the concave zone.

9. An aircraft cabin, comprising at least one baggage compartment according to claim 1.

10. An aircraft, comprising at least one baggage compartment according to claim 1.

11. The baggage compartment according to claim 1, wherein
a color of the liquid crystal layer when opaque matches a color of an outer face of a rear panel of the compartment.

12. The baggage compartment according to claim 1, wherein only the wall is visible from the space of the travelers when the compartment is in a closed position.

13. The baggage compartment according to claim 1, wherein a rear panel of the compartment has an elongated shape slightly curved along a longitudinal axis.

14. The baggage compartment according to claim 1, wherein an edge of the front portion of the wall includes notches so that the front portion of the wall does not cover the slits.

15. A baggage compartment enclosed in a space configured to accommodate travelers in a vehicle, the compartment comprising at least one wall defining the compartment, wherein
the compartment is visible from a space of the travelers within which the compartment is located,
the wall includes several openings in a form of slits spaced over a length of the wall, and each of the slits are closed off with a transparent material configured to allow a view through the opening,
a front portion of the wall overlaps a panel of the wall in which the slits are located,
the transparent material is covered with a liquid crystal layer and a means for applying a difference of electric potential to the liquid crystal layer,
the layer is opaque or translucent depending on the difference of potential applied, and
an inner face of the wall comprises an illumination means for illuminating an inside of the compartment.

16. The baggage compartment according to claim 15, wherein an edge of the front portion of the wall includes notches so that the front portion of the wall does not cover the slits.

17. The baggage compartment according to claim 15, wherein
a color of the liquid crystal layer when opaque matches a color of an outer face of a rear panel of the compartment.

18. A baggage compartment enclosed in a space configured to accommodate travelers in a vehicle, the compartment comprising at least one wall defining the compartment, wherein
the compartment is visible from a space of the travelers within which the compartment is located,
the wall includes several openings in a form of slits spaced over a length of the wall, and each of the slits are closed off with a transparent material configured to allow a view through the opening,
a front portion of the wall overlaps a panel of the wall in which the slits are located, the transparent material is covered with a liquid crystal layer and a means for applying a difference of electric potential to the liquid crystal layer,
the layer is opaque or translucent depending on the difference of potential applied, and
an inner face of the wall comprises at least one concave zone, and the openings are arranged in the concave zone.

19. The baggage compartment according to claim 18, wherein an edge of the front portion of the wall includes notches so that the front portion of the wall does not cover the slits.

20. The baggage compartment according to claim 18, wherein
a color of the liquid crystal layer when opaque matches a color of an outer face of a rear panel of the compartment.

* * * * *